(12) United States Patent
Tiirola et al.

(10) Patent No.: US 8,897,249 B2
(45) Date of Patent: *Nov. 25, 2014

(54) DEPLOYMENT OF LTE UL SYSTEM FOR ARBITRARY SYSTEM BANDWIDTHS VIA PUCCH CONFIGURATION

(71) Applicant: Nokia Siemens Networks Oy, Espoo (FI)

(72) Inventors: Esa T. Tiirola, Kempele (FI); Kari Hooli, Oulu (FI); Kari P. Pajukoski, Oulu (FI); Sabine Roessel, Munich (DE)

(73) Assignee: Nokia Siemens Networks Oy, Espoo (FI)

( * ) Notice: Subject to any disclaimer, the term of this patent is extended or adjusted under 35 U.S.C. 154(b) by 43 days.

This patent is subject to a terminal disclaimer.

(21) Appl. No.: 13/767,132

(22) Filed: Feb. 14, 2013

(65) Prior Publication Data

US 2013/0155986 A1 Jun. 20, 2013

Related U.S. Application Data

(63) Continuation of application No. 12/454,675, filed on May 20, 2009, now Pat. No. 8,406,182.

(51) Int. Cl.
*H04W 72/04* (2009.01)
*H04L 5/00* (2006.01)
*H04L 1/00* (2006.01)

(52) U.S. Cl.
CPC .............. *H04W 72/04* (2013.01); *H04L 5/0053* (2013.01); *H04L 5/0066* (2013.01); *H04L 1/0026* (2013.01); *H04L 1/0027* (2013.01); *H04L 5/0007* (2013.01); *H04L 5/0016* (2013.01)
USPC .......................................... 370/329; 455/63.1

(58) Field of Classification Search
CPC .... H04W 72/04; H04W 28/04; H04L 1/0026; H04L 1/0027; H04L 5/0007; H04L 5/0016; H04L 5/0053; H04L 5/0066
USPC ......... 370/203–329, 389, 467; 455/63.1, 522; 375/240–351
See application file for complete search history.

(56) References Cited

U.S. PATENT DOCUMENTS

| 5,608,446 | A   | 3/1997 | Carr et al. ...................... 725/114 |
| 8,009,782 | B2* | 8/2011 | Baumgartner et al. ....... 375/351 |

(Continued)

FOREIGN PATENT DOCUMENTS

| EP | 1 906 686 A1    | 4/2008 |
| WO | WO-2007/045504 A1 | 4/2007 |

OTHER PUBLICATIONS

"Update of uplink reference-signal hopping, downlink reference signals, scambling sequences,DwPTS/UpPTS lengths for TDD and control channel process", Ericsson, 3GPP TSG-RAN WG1 Meeting #52, R1-081155, Feb. 2008, 61 pgs.

(Continued)

*Primary Examiner* — Afsar M Qureshi
(74) *Attorney, Agent, or Firm* — Harrington & Smith (57) ABSTRACT

In accordance with an example embodiment of the present invention, there is at least a method, apparatus, and computer program product to perform an over-provisioning of a radio resource including a periodic channel quality indicator resource in a predetermined way, and an allocating of the radio resource in such a manner that at least one of an effective system bandwidth is reduced and out-of-band emissions related to the allocated radio resource are taken into account.

27 Claims, 7 Drawing Sheets

(56) References Cited

U.S. PATENT DOCUMENTS

| | | | |
|---|---|---|---|
| 2005/0289618 A1 | 12/2005 | Hardin | 725/95 |
| 2007/0041384 A1 | 2/2007 | Das et al. | 370/395.4 |
| 2008/0025254 A1 | 1/2008 | Love et al. | 370/329 |
| 2008/0186880 A1* | 8/2008 | Seki et al. | 370/281 |
| 2010/0182975 A1 | 7/2010 | Malladi et al. | 370/330 |
| 2012/0014243 A1* | 1/2012 | Bertrand et al. | 370/203 |

OTHER PUBLICATIONS

"Correction of PUCCH in absent of mixed format", Ericsson, 3GPP TSG-RAN Meeting #53, R1-082063, May 2008, 6 pgs.

"Channelization of SRI and persistent ACK/NACK on PUCCH", Nokia Siemens Networks, 3GPP TSG RAN WG1 Meeting #52bis, Mar.-Apr. 2008, 5 pgs.

"Edge Sidelobe Suppressor Schemes for Uplink of Orthogonal Frequency Division Multiple Access Systems", Hwasun Yoo, et al., IEEE 2002, pp. 584-588.

"Reduction of Out-of-Band Radiation in OFSM Based Overlay Systems", Sinja Brandes et al., IEEE 2005, pp. 662-665.

3GPP TS 36.211 V8.2.0, Technical Specification Group Radio Access Network, Evolved Universal Terrestrial Radio Access (E-UTRA), Physical Channels and Modulation (Release 8), (Mar. 2008), 65 pages.

3GPP TS 36.300 V8 3.0, Technical Specification Group Radio Access Network, Evolved Universal Terrestrial Radio Access (E-UTRA) and Evolved Universal Terrestrial Radio Access Network (E-UTRAN), Overall description, Stage 2 (Release 8), (Dec. 2007), 121 pages.

NTT DOCOMO, Inc., Propsals for LTE-Advanced Technologies, R1-081948, 3GPP TSG RAN WG1 Meeting #53, May 5-9, 2008, 29 pages, Kansas City, USA.

3GPP TS 36.101 V8.1.0. Technical Specification Group Radio Access Network, Evolved Universal Terrestrial Radio Access (E-UTRA), User Equipment (UE) radio transmission and reception (Release 8), (Mar. 2008), 43 pages.

3GPP TS 36.104 V8.1.0, Technical Specification Group Radio Access Network, Evolved Universal Terrestrial Radio Access (E-UTRA), Base Station (BS) radio transmission and reception (Release 8), (Mar. 2008), 52 pages.

3GPP TR 36.942 V1.0.0, Technical Specification Group Radio Access Network, Evolved Universal Terrestrial Radio Access (E-UTRA), Radio Frequency (RF) system scenarios (Release 8), (Feb. 2007), 56 pages.

* cited by examiner

DEPLOYMENT OF LTE UL SYSTEM FOR ARBITRARY SYSTEM BANDWIDTHS VIA PUCCH CONFIGURATION

CROSS-REFERENCE TO RELATED APPLICATIONS

This applications is a continuation of, and claims priority to allowed U.S. patent application No. 12/454,675 filed on May 20, 2009, which claims priority under 35 U.S.C. §119(e) from Provisional Patent Application No. 61/128,341, filed May 21, 2008 the disclosure of which is incorporated by reference herein in its entirety.

TECHNICAL FIELD

The exemplary and non-limiting embodiments of this invention relate generally to wireless communication systems, methods, devices, and computer program products and, more specifically, and relate to techniques for uplink signaling between a user equipment and a network access node.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Various abbreviations that appear in the specification and/or in the drawing figures are defined as follows:
3GPP third generation partnership project
UTRAN universal terrestrial radio access network
EUTRAN evolved UTRAN (LTE)
LTE long term evolution
Node B base station
eNB EUTRAN Node B (evolved Node B)
UE user equipment
UL uplink (UE towards eNB)
CAZAC constant-amplitude zero auto-correlation
DL downlink (eNB towards UE)
EPC evolved packet core
MME mobility management entity
S-GW serving gateway
MM mobility management
HO handover
C-RNTI cell radio network temporary identifier
PDU protocol data unit
PRB physical resource block
PHY physical
SN sequence number
RB radio bearer
RLC radio link control
RRC radio resource control
RRM radio resource management
MAC medium access control
PDCP packet data convergence protocol
O&M operations and maintenance
SDU service data unit
BW bandwidth
CDM code division multiplexing
CQI channel quality indicator
FDD frequency division duplex
FDMA frequency division multiple access
FDM frequency division multiplexing
HARQ hybrid automatic repeat request
ACK acknowledgement
NACK negative ACK
OFDMA orthogonal frequency division multiple access
SC-FDMA single carrier, frequency division multiple access
TDD time division duplex
TTI transmission time interval
PUCCH physical uplink control channel
PUSCH physical uplink shared channel
PRACH physical random access channel
ACLR adjacent channel leakage ratio
FSU flexible spectrum usage
LA local area
Rel. 8 release 8
SIB system information block
SRI scheduling request indicator A communication system known as evolved UTRAN (E-UTRAN, also referred to as UTRAN-LTE or as E-UTRA) has been under development within the 3GPP. It has been specified that the DL access technique will be OFDMA, and the UL access technique will be SC-FDMA. In the above mentioned communication system, a basic uplink transmission scheme is a single-carrier transmission frequency division multiple access (SC-FDMA) with a cyclic prefix to achieve uplink inter-user orthogonality and to enable efficient frequency-domain equalization at the receiver side. Frequency-domain generation of the signal, sometimes known as DFT-spread orthogonal frequency division multiplexing (DFT S-OFDM), is assumed.

Figure 1:
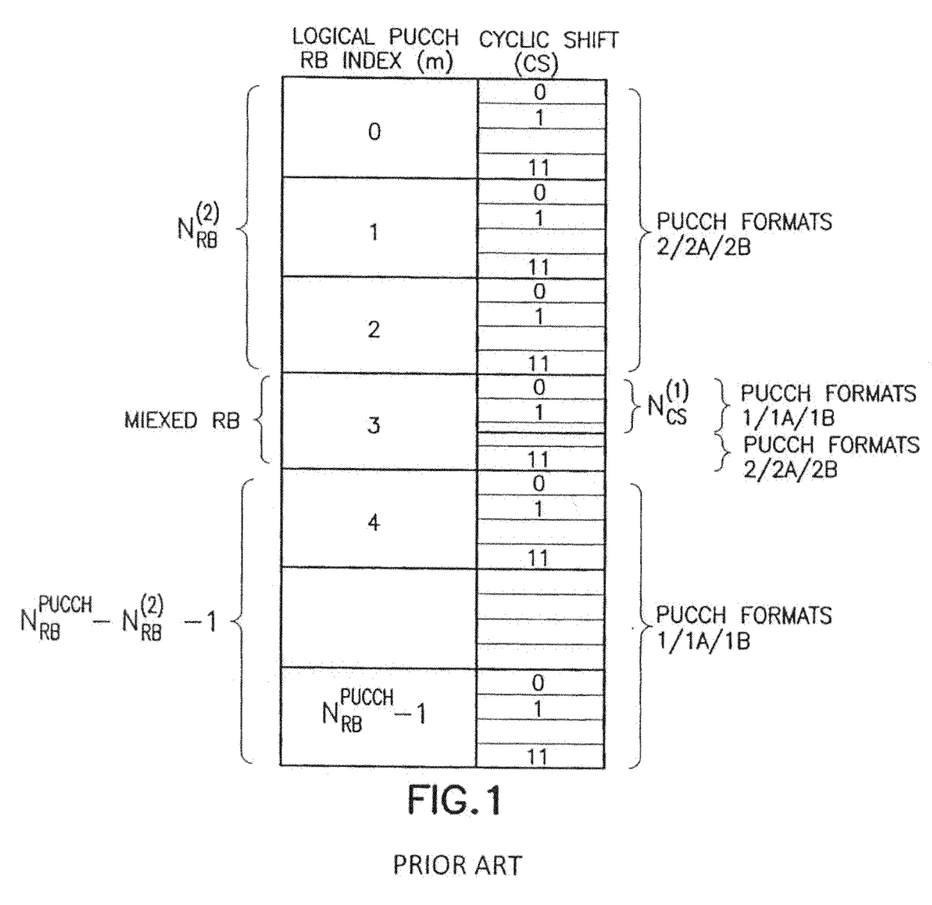
FIG. 1 shows the configuration of the PUCCH and illustrates the logical split between different PUCCH formats and the way how the PUCCH is configured as in accordance with the LTE specification 3GPP TS 36.211, 3rd Generation Partnership Project.

Within this uplink transmission, a physical uplink control channel (PUCCH) sub-frame structure carries UL control information such as ACK/NACK, CQI, and Scheduling Request Indicator (SRI) information. It has been understood that a PUCCH is used in the absence of UL data, and that the PUCCH may not be transmitted simultaneously with a physical uplink shared channel (PUSCH) from the same UE, as indicated in LTE specification Rel. 8. FIG. 1 shows the logical split between different PUCCH formats and the way the PUCCH is configured in accordance with the LTE specification. For more detailed information reference can be made to 3GPP TS 36.211 V8.2.0 (2008-03), 3rd Generation Partnership Project; Technical Specification Group Radio Access Network; Evolved Universal Terrestrial Radio Access (E-UTRA); Physical Channels and Modulation (Release 8).

The PUCCH sub-frame structure for UL control information signaling consists of two slots. Further, there may be seven SC-FDMA symbols, which are also referred to herein as "LBs" for convenience, defined per slot. A part of these LBs are used for reference signals such as pilot long blocks for coherent demodulation, while the remaining LBs are used for control and/or data transmission. An assumption has been that for the PUCCH, the multiplexing within a physical resource block (PRB) is performed using code division multiplexing (CDM), whereas a localized frequency division multiplexing (FDM) is used for other different resource blocks. In the PUCCH the bandwidth of one control and pilot signal always corresponds to one PRB.

SUMMARY

According to a first aspect of the invention, there is a method comprising over-provisioning a radio resource comprising a periodic channel quality indicator resource in a predetermined way, and allocating the radio resource in such a manner that at least one of an effective system bandwidth is reduced and out-of-band emissions related to the allocated radio resource are taken into account.

According to another aspect of the invention there is a computer readable medium encoded with a computer program executable by a processor to perform the method indicated in the preceding paragraph.

According to another aspect of the invention, there is an apparatus comprising a processor configured to over-provision a radio resource comprising a periodic channel quality indicator resource in a predetermined way, and the processor configured to allocate the radio resource in such a manner that at least one of an effective system bandwidth is reduced and out-of-band emissions related to the allocated radio resource are taken into account.

According to yet another aspect of the invention, there is an apparatus comprising means for over-provisioning a radio resource comprising a periodic channel quality indicator resource in a predetermined way, and means for allocating the radio resource in such a manner that at least one of an effective system bandwidth is reduced and out-of-band emissions related to the allocated radio resource are taken into account.

BRIEF DESCRIPTION OF THE DRAWINGS

For a more complete understanding of example embodiments of the present invention, reference is now made to follow descriptions taken in connection with the accompanying drawings in which:

FIGS. 5a and 5b, collectively referred to as FIG. 5, illustrate the principle of adjusting the active bandwidth (FIG. 5b) in accordance with an exemplary embodiment of the invention as relative to the conventional approach illustrated in FIG. 5a;

DETAILED DESCRIPTION OF THE DRAWINGS

An example embodiment of the present invention and its potential advantages are understood by referring to FIGS. 1 through 10 of the drawings.

FIG. 1 shows the configuration of the PUCCH and illustrates the logical split between different PUCCH formats and the way how the PUCCH is configured in the LTE specification the configuration of the PUCCH.

Different UEs are multiplexed on the PUCCH by means of CDM (i.e., CDM within the same resource block (RB)). Two basic PUCCH formats are supported in LTE Rel. 8 specifications, namely Format 1 and Format 2. Both formats use a cyclic shift of a constant-amplitude zero auto-correlation (CAZAC) sequence in each symbol (CDM in cyclic shift domain). Format 1 also utilizes block-wise spreading on top of the CAZAC sequence (CDM using block spreading codes).

Figure 2:
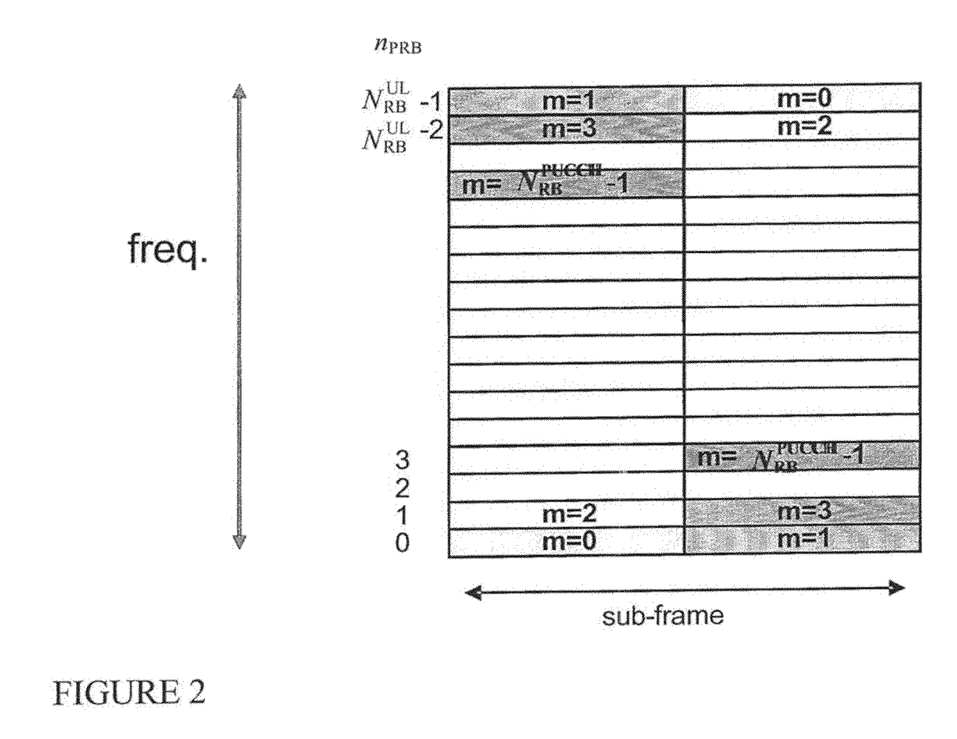
FIG. 2 illustrates a mapping to physical resource blocks for the PUCCH as per 3GPP TS 36.211.

FIG. 2 shows a conventional mapping of logical resource blocks (denoted as m) into physical resource blocks.

In FIG. 2 it is shown that slot-based frequency hopping is used on the PUCCH. In FIG. 2 the $n_{PRB}$ refers to a physical resource block number (index), and $N_{RB}^{UL}$ refers to an uplink bandwidth configuration, expressed in multiples of ($N_{sc}^{RB}$=12).

Further, as shown in FIG. 2 the PUCCH is located symmetrically at both edges of the total transmission bandwidth.

Figure 3:
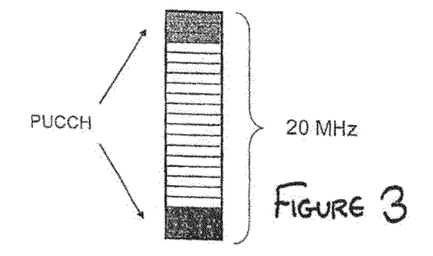
FIG. 3 is another view of the PUCCH, and shows it allocated symmetrically at both edges of the total transmission bandwidth.

FIG. 3 similarly shows how the PUCCH is located symmetrically at both edges of the total transmission bandwidth according to conventional standards. Therefore, the UL bandwidth (including PUCCH) is always $N_{RB}^{UL}$×180 kHz, $N_{RB}^{UL} \in [6, 15, 25, 50, 75, 100]$. This is similarly illustrated in Table 5.4.2-1 of 3GPP TS 36.101, V8.1.0 (2008-03), 3rd Generation Partnership Project.

Figure 4:
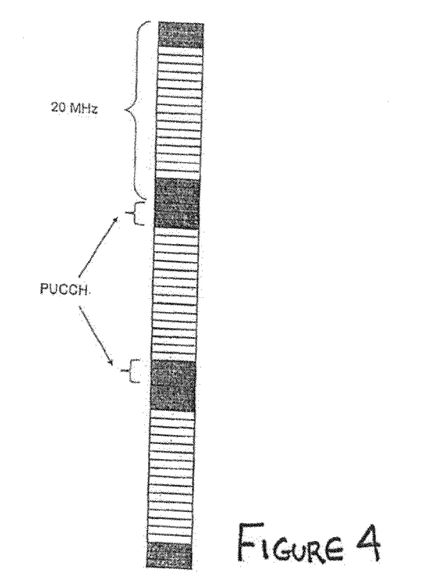
FIG. 4 illustrates an example of a placement of the PUCCH for LTE-A with N×20 MHz bandwidth (N=3)

FIG. 4 shows a conventional LTE-A UL deployment consisting of a 3×20 MHz system bandwidth, and a placement of the PUCCH for LTE-A.

It can be seen in FIG. 4 that the Release 8 PUCCH will cause a non-contiguous spectrum for LTE-A UEs having bandwidth allocation larger than 20 MHz. That is, the problem from the LTE-A UE point of view is that a transmission bandwidth larger than 20 MHz cannot be supported with the Rel. 8 SC-FDMA, since only continuous spectrum usage is allowed.

Figure 5A:
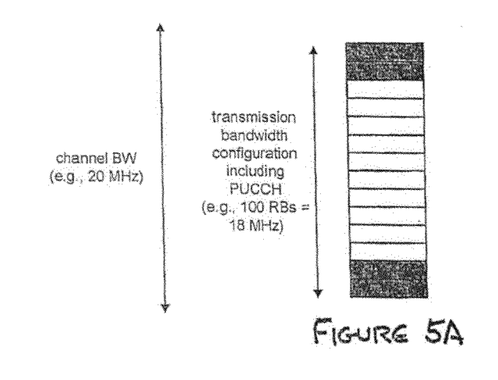
Figure 5B:
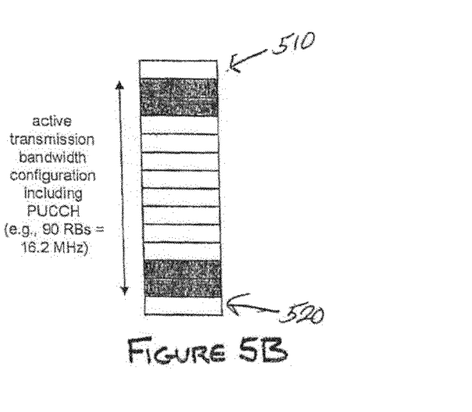

FIG. 5 is represented by FIGS. 5a and 5b.

FIG. 5a illustrates a conventional approach where a transmission bandwidth configuration including PUCCH is, as an example, 100 RBs which equal 18 MHz.

FIG. 5b illustrates where the active bandwidth is adjusted in accordance with the exemplary embodiments of the invention so that the transmission bandwidth configuration including PUCCH is, as an example, 90 RBs which equal 16.2 MHz.

Figure 6:
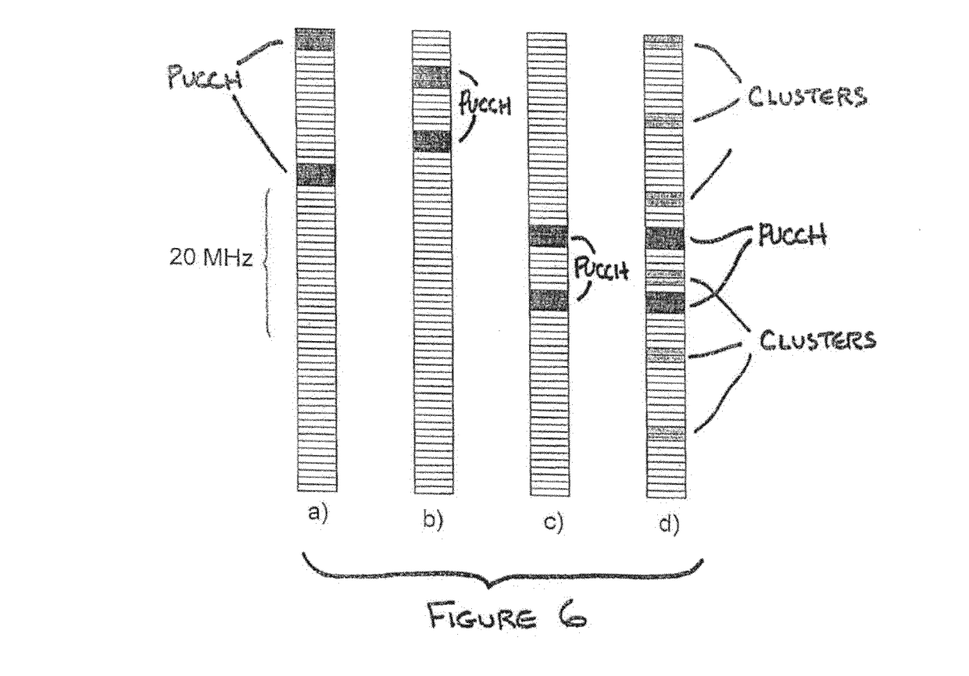
FIGS. 6a, 6b, 6c and 6d, collectively referred to as FIG. 6, illustrate different exemplary LTE-A use cases in accordance with the use of the exemplary embodiments of the invention.

FIG. 6 shows different LTE-A use cases (e.g., FIGS. 6a, 6b, 6c, and 6d) in accordance with the exemplary embodiments.

FIG. 6a may be viewed as an already proposed technique that shows an example of a 3×20 MHz deployment of the LTE-A UL system. FIG. 6a assumes that one of the 20 MHz sub-bands contains all the LTE Rel. 8 UEs, and thus contains the Rel. 8 PUCCH.

FIGS. 6b and 6c show two use cases where the Rel. 8 PUCCH is made narrower by the use of these exemplary embodiments, with the goal being to provide a larger continuous spectrum for LTE-A UEs 10.

FIG. 6d shows an example where the exemplary embodiments are used to obtain additional flexibility in arranging a multi-cluster transmission in the LTE-A UL system. In some cases it is beneficial (mainly from a cubic metric (CM) point of view) to be able to provide equally spaced clusters for clustered LTE-A transmissions.

Figure 7:
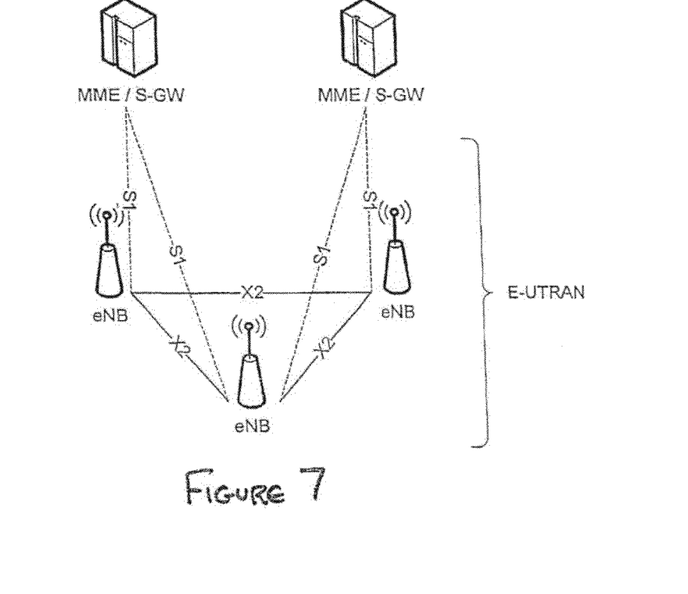
FIG. 7 reproduces FIG. 4 of 3GPP TS 36.300, and shows the overall architecture of the E-UTRAN system.

FIG. 7 reproduces FIG. 4 of 3GPP TS 36.300 V8.3.0 (2007-12), and shows the overall architecture of the E-UTRAN system.

In FIG. 7 there is illustrated network nodes and gateways (e.g., MME/S-GW and eNBs) using different interfaces in order to provide connectivity with other network nodes and/or a network such as a telephone network and/or a data communications network (e.g., the internet).

Figure 8:
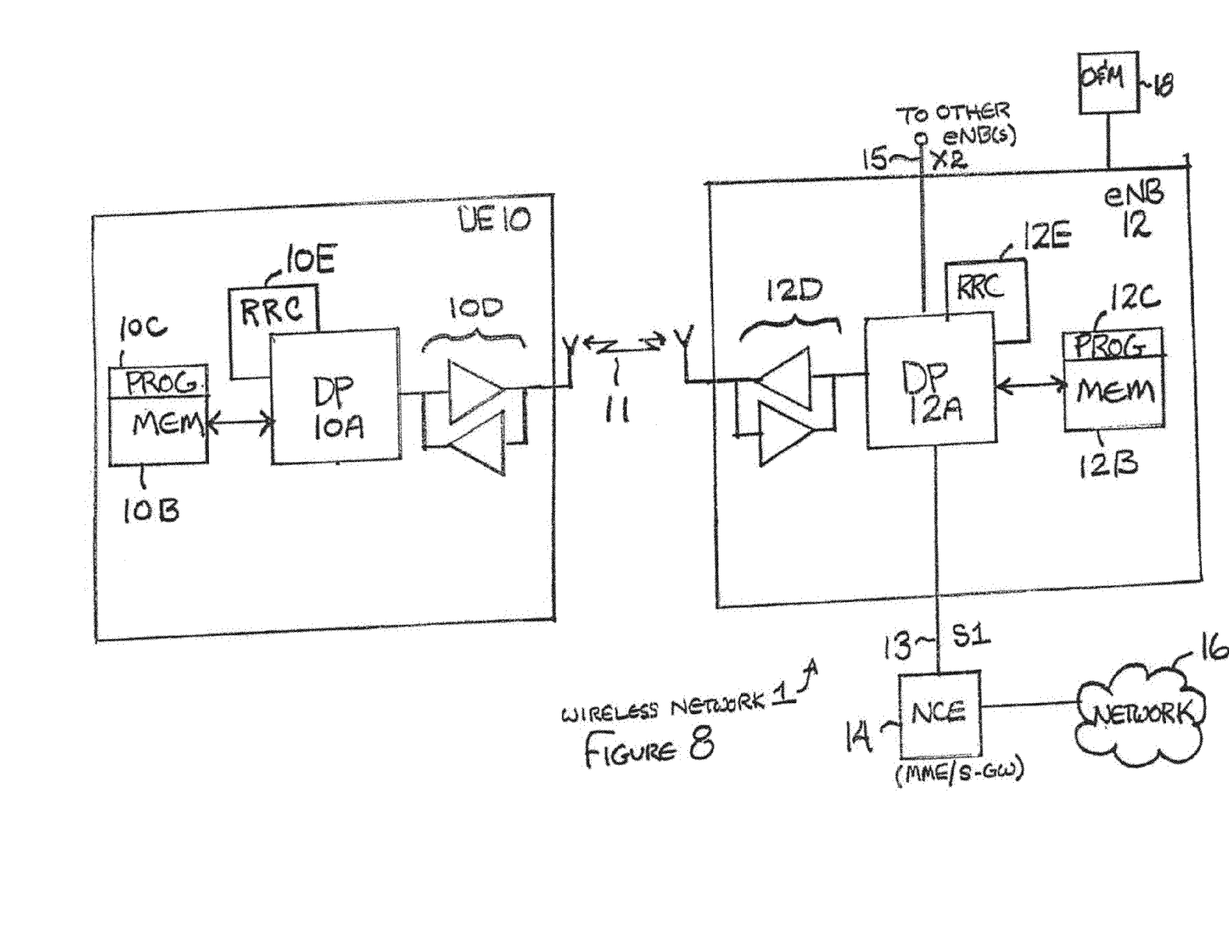
FIG. 8 shows a simplified block diagram of various electronic devices that are suitable for use in practicing the exemplary embodiments of this invention.

FIG. 8 shows a simplified block diagram of various electronic devices that are suitable for use in practicing the exemplary embodiments of this invention. In FIG. 8 there is illustrated a wireless network 1 adapted for communication with an apparatus, such as a mobile communication device which may be referred to as a UE 10, via a network access node, such as a Node B (base station), and more specifically an eNB 12.

As shown in FIG. 8, the network 1 may include a network control element (NCE) 14 that may include the MMB/S-GW functionality shown in FIG. 7, and which provides connectivity with a network 16, such as a telephone network and/or a data communications network (e.g., the internet). The UE 10 includes a data processor (DP) 10A, a memory (MEM) 10B that stores a program (PROG) 10C, and a suitable radio frequency (RF) transceiver 10D for bidirectional wireless communications 11 with the eNB 12 via one or more antennas. The eNB 12 also includes a DP 12A, a MEM 12B that stores a PROG 12C, and a suitable RF transceiver 12D. The eNB 12 is coupled via a data path 13 to the NCE 14. The data path 13 may be implemented as the S1 interface shown in FIG. 7. At least one of the PROGs 10C and 12C is assumed to include program instructions that, when executed by the associated DP, enable the electronic device to operate in accordance with the exemplary embodiments of this invention, as will be discussed below in greater detail.

It is noted that the exemplary embodiments of this invention may be implemented at least in part by computer software executable by the DP 10A of the UE 10 and by the DP 12A of the eNB 12, or by hardware, or by a combination of software and hardware.

Figure 9:
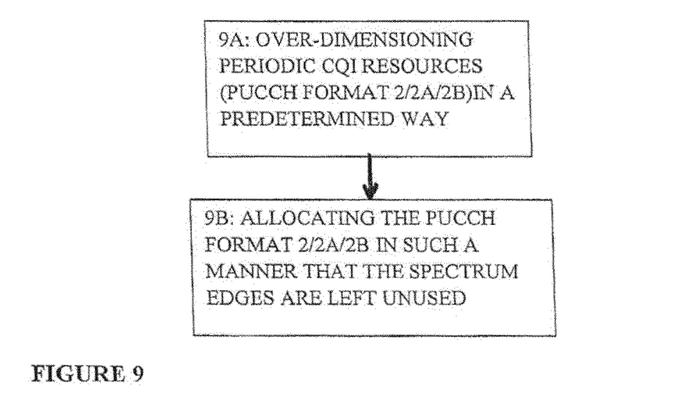
FIG. 9 is a logic flow diagram that illustrates the operation of a method and a result of execution of computer program instructions, in accordance with the exemplary embodiments of this invention.

FIG. 9 is a logic flow diagram that illustrates the operation of a method, and a result of execution of computer program instructions, in accordance with the exemplary embodiments of this invention.

At Block 9A of FIG. 9 there is a step of over-dimensioning periodic CQI resources (PUCCH format 2/2a/2b) in a predetermined way, and at Block 9B of FIG. 9 there is a step of allocating the PUCCH format 2/2a/2b in such a manner that the spectrum edges are left unused.

Figure 10:
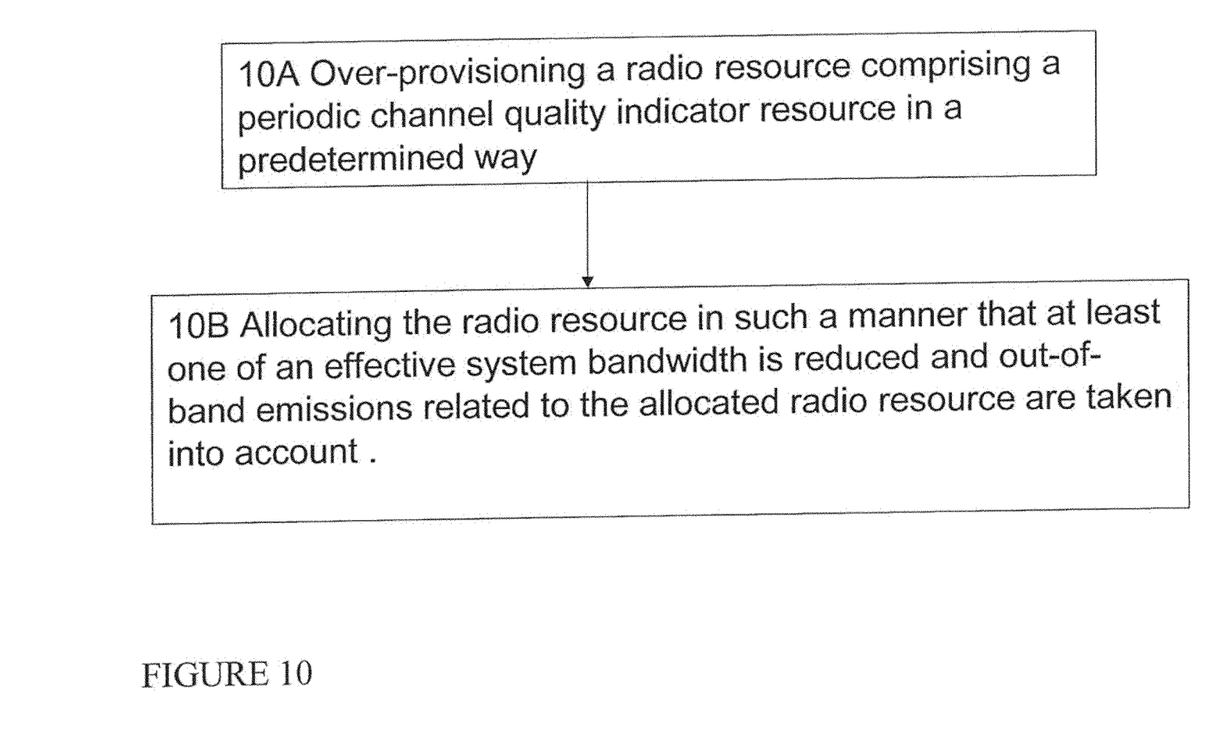
FIG. 10 is a logic flow diagram that illustrates another operation of a method and a result of execution of computer program instructions, in accordance with the exemplary embodiments of this invention.

FIG. 10 is a logic flow diagram that illustrates a method, apparatus, and computer program product(s), in accordance with the exemplary embodiments of the invention. At Block 10A of FIG. 10 there is a step of over-provisioning a radio resource comprising a periodic channel quality indicator resource in a predetermined way, and at Block 10B of FIG. 10 there is a step of allocating the radio resource in such a manner that at least one of an effective system bandwidth is reduced and out-of-band emissions related to the allocated radio resource are taken into account.

DETAILED DESCRIPTION

Without in any way limiting the scope, interpretation, or application of the claims appearing below, a technical effect of one or more of the example embodiments disclosed herein is a technique to adjust the system UL bandwidth in, as one non-limiting example, LTE (release 8). Another technical effect of one or more of the example embodiments disclosed herein is to provide an enhanced allocation of bandwidth for an uplink control channel, and more specifically to provide an adjusted allocation of uplink system bandwidth and an adjusted allocation of an uplink control channel. Another technical effect of one or more of the example embodiments disclosed herein is to provide an apparatus comprising means for over-dimensioning or over-provisioning periodic CQI resources (PUCCH format 2/2a/2b) in a predetermined way, and means responsive to said over-dimensioned resources for allocating the PUCCH format 2/2a/2b in such a manner that the spectrum edges are left unused.

The exemplary embodiments of this invention relate to the UL part of the UTRAN LTE Rel. 8 and its evolution towards further releases (e.g., towards LTE-Advanced or LTE-A). Further, the exemplary embodiments of this invention relate to the use of the physical uplink control channel (PUCCH) sub-frame structure for uplink control signaling. More specifically, the exemplary embodiments consider the configuration of the PUCCH and relate to a method, apparatus, and computer program product to provide an enhanced allocation of the PUCCH.

FIG. 7 reproduces FIG. 4 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1-MME interface and to a Serving Gateway (S-GW) by means of a S1-U interface. The S1 interface supports a many-to-many relation between MMEs/Serving Gateways and eNBs.

The eNB hosts the following functions:

functions for Radio Resource Management: Radio Bearer Control, Radio Admission Control, Connection Mobility Control, Dynamic allocation of resources to UEs in both uplink and downlink for scheduling;

IP header compression and encryption of user data stream;

selection of a MME at UE attachment;

routing of User Plane data towards Serving Gateway;

scheduling and transmission of paging messages, such as those which originated from the MME;

scheduling and transmission of broadcast information, such as those which originated from the MME or O&M; and measurement and measurement reporting configuration for mobility and scheduling.

As previously indicated, a PUCCH carries UL control information such as ACK/NACK, CQI, and Scheduling Request Indicator (SRI) information. As indicated in LTE Rel. 8, the PUCCH is used in the absence of UL data, and the PUCCH may not be transmitted simultaneously with a PUSCH from the same UE.

FIG. 1 shows the configuration of the PUCCH. In FIG. 1 there is illustrated the logical split between different PUCCH formats and the way how the PUCCH is configured in the LTE specification. Reference can be made to 3GPP TS 36.211 V8.2.0 (2008-03), 3rd Generation Partnership Project; Technical Specification Group Radio Access Network; Evolved Universal Terrestrial Radio Access (E-UTRA); Physical Channels and Modulation (Release 8).

Different UEs are multiplexed on the PUCCH by means of CDM (i.e., CDM within the same resource block (RB)). Two basic PUCCH formats, supported in LTE Rel. 8 specifications, are Format 1 and Format 2. Both of these formats use a cyclic shift of a CAZAC sequence in each symbol or CDM in a cyclic shift domain. Format 1 also utilizes block-wise spreading on top of the CAZAC sequence or CDM using block spreading codes.

The PUCCH supports multiple formats such as 1, 1a, 1b, 2, 2a, 2b and a mix of formats 1/1a/1b and 2/2a/2b. PUCCH formats have been used in the following manner:

Format 1: SRI
Format 1a: 1-bit A/N
Format 1b: 2-bit A/N
Format 2: Periodic CQI
Format 2a: Periodic CQI+1-bit A/N
Format 2b: Periodic CQI+2-bit A/N The PUCCH is configured using the following parameters (see 3GPP TS 36.211 for a complete list):

$N_{RB}^{PUCCH}$ Number of resource blocks in a slot used for PUCCH transmission (set by higher layers)

$N_{RB}^{(2)}$ Bandwidth reserved for PUCCH formats 2/2a/2b, expressed in multiples of $N_{sc}^{RB}$ $N_{cs}^{(1)}$ Number of cyclic shifts used for PUCCH formats 1/1a/1b in a resource block with a mix of formats 1/1a/1b and 2/2a/2b $N_{sc}^{RB}$ Resource block size in the frequency domain, expressed as a number of subcarriers (=12)

Mapping of logical resource blocks (denoted as m) into physical resource blocks is shown in FIG. 2. It is noted that slot-based frequency hopping is always used on PUCCH.

$n_{PRB}$ Physical resource block number (index)

$N_{RB}^{UL}$ Uplink bandwidth configuration, expressed in multiples of ($N_{sc}^{RB}$=12)

By configuration of the PUCCH reserved resources, available PUSCH resources can be defined as well as potential positions of the PRACH (to be within the PUSCH resource area).

It is noted that it has been previously decided that sounding reference signal transmissions should not puncture the PUCCH.

At least two problems are seen to exist according to these specifications:

A first problem relates to the deployment of the UL system according to LTE Rel. 8. To illustrate a source of the problem, as shown in FIG. 3 (and FIG. 2), it can be seen that the PUCCH is located symmetrically at both edges of the total transmission bandwidth. This means that the UL bandwidth, including PUCCH, is always $N_{RB}^{UL} \times 180$ kHz, $N_{RB}^{UL} \in [6, 15, 25, 50, 75, 100]$ as illustrated in Table 5.4.2-1 of 3GPP TS 36.101, V8.1.0 (2008-03), 3rd Generation Partnership Project; Technical Specification Group Radio Access Network; Evolved Universal Terrestrial Radio Access (E-UTRA); User Equipment (UE) radio transmission and reception (Release 8).

It can be seen that it would be highly beneficial to be able adjust the UL system bandwidth with increased granularity such that an active bandwidth is adjusted for example so that the transmission bandwidth configuration including PUCCH is, for example, 90 RBs equal to 16.2 MHZ. Thus, in accordance with a non-limiting example of the exemplary embodiments the spectrum edges of the bandwidth remain unused. Reason for this feature include that many operators face deployment situations where at least the UL system bandwidth is not matched by one of the standardized UL system bandwidths as mentioned above. This is seen to be the case despite the coexistence analysis report (3GPP TR 36.942) as well as conclusive transceiver specifications for the UE (3GPP TS 36.101 v8.1.0) and for the BS (3GPP TS 36.104 v8.1.0). In addition, it is noted that using a smaller standardized UL system bandwidth drastically reduces spectral efficiency, while using too large of a bandwidth is simply not possible due to regulation requirements and emission limits.

A second problem relates to the LTE-Advanced system. It has been decided that LTE Rel. 8 terminals should be able to operate in the LTE-A system. FIG. 4 shows an example of an LTE-A UL deployment consisting of a 3×20 MHz system bandwidth. It can be seen in FIG. 4 that the Rel. 8 PUCCH will cause a non-contiguous spectrum for LTE-A UEs having a bandwidth allocation larger than 20 MHz. Thus, it can be seen that a problem exists from a point of view of the LTE-A UE for at least the reason that a transmission bandwidth larger than 20 MHz cannot be supported with the Rel. 8 SC-FDMA. This is seen to be the case for at least the reason that only a continuous spectrum usage is allowed. Reference in this regard may be made to 3GPP TSG RAN WG1 Meeting #53, Kansas City, USA, May 5-9, 2008, R1-081948, Proposals for LTE-Advanced Technologies, NTT DoCoMo, Inc.

Reference is made to FIG. 8 for illustrating a simplified block diagram of various electronic devices that are suitable for use in practicing the exemplary embodiments of this invention. In FIG. 8 a wireless network 1 is adapted for communication with an apparatus, such as a mobile communication device which may be referred to as a UE 10, via a network access node, such as a Node B (base station), and more specifically an eNB 12. The network 1 may include a network control element (NCE) 14 that may include the MME/S-GW functionality shown in FIG. 7, and which provides connectivity with a network 16, such as a telephone network and/or a data communications network (e.g., the internet). The UE 10 includes a data processor (DP) 10A, a memory (MEM) 10B that stores a program (PROG) 10C, and a suitable radio frequency (RF) transceiver 10D for bidirectional wireless communications 11 with the eNB 12 via one or more antennas. The eNB 12 also includes a DP 12A, a MEM 12B that stores a PROG 12C, and a suitable RF transceiver 12D. The eNB 12 is coupled via a data path 13 to the NCE 14. The data path 13 may be implemented as the S1 interface shown in FIG. 7. At least one of the PROGs 10C and 12C is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 10A of the UE 10 and by the DP 12A of the eNB 12, or by hardware, or by a combination of software and hardware.

Also shown is an O&M function 18 that is coupled with the eNB 12, the use of which is discussed below.

For the purposes of describing the exemplary embodiments of this invention the UE 10 may be assumed to also include a RRC function 10E, and the eNB 12 includes a corresponding RRC function 12E. Signaling of PUCCH parameters between the eNB 12 and the UE 10 may be achieved using RRC signaling, as discussed below.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A may be of any type suitable to the local technical environment, and may include one or more of general purpose computers, special purpose computers, microprocessors, digital signal processors (DSPs) and processors based on a multicore processor architecture, as non-limiting examples. Embodiments of the present invention may be implemented in software, hardware, application logic or a combination of software, hardware and application logic. The software, application logic and/or hardware may reside on devices including the UE 10, or eNB 12. If desired, part of the software, application logic and/or hardware may reside on devices such as the NCE 14, and part of the software, application logic and/or hardware may reside on the O&M 18. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 8. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The exemplary embodiments of this invention provide a technique to adjust the system UL bandwidth in, as one non-limiting example, LTE (release 8). The general principle is shown in FIG. 5. In FIG. 5a there is illustrated a conventional approach where a transmission bandwidth configuration including PUCCH is 100 RBs equal to 18 MHz. Whereas, FIG. 5b illustrates, in accordance with the exemplary embodiments of the invention, where the active bandwidth is adjusted so that the transmission bandwidth configuration including PUCCH is, for example, 90 RBs equal to 16.2 MHz. Thus, in accordance with a non-limiting example of the exemplary embodiments the spectrum edges, indicated as 510 and 520, of the bandwidth remain unused. Further, in accordance with a non-limiting exemplary embodiment of the invention the terms active bandwidth and effective bandwidth may be used interchangeably in the specification, and these terms can be used to refer to at least a transmission bandwidth configuration.

More specific examples of the exemplary embodiments of the invention are as follows:

(1) The periodic CQI resource (PUCCH format 2/2a/2b) is over-dimensioned in a pre-determined way. This is achieved by selecting the parameters $N_{RB}^{(2)}$ and $N_{cs}^{(1)}$ such that $N_{RB}^{(2)} N_{sc}^{RB} + (N_{sc}^{RB} - N_{cs}^{(1)} - 2) \gg$ (number of simultaneous resources allocated to PUCCH format 2/2a/2b), where $\gg$ is a "much greater than" symbol;

$n_{PUCCH}^{(2)}$ is the resource index (size) for PUCCH formats 2/2a/2b;

$N_{sc}^{RB}$ equals resource block size in the frequency domain, expressed as a number of subcarriers ($N_{sc}^{RB}=12$);

$N_2^{RB}$ is the bandwidth reserved for PUCCH formats 2/2a/2b, expressed in multiples of $N_{sc}^{RB}$; and $N_{CS}^{(1)}$ is the number of cyclic shifts used for PUCCH formats 1/1a/1b in a mixed resource block (containing PUCCH formats 1/1a/1b and 2/2a/2b).

The dimensioning or provisioning of the PUCCH resource is performed in such a way that a predetermined number of PUCCH format 2/2a/2b resources (RBs) can be left unused (i.e., there is still a sufficient number of usable PUCCH format 2/2a/2b resources). Further, in accordance with a non-limiting exemplary embodiment of the invention the terms over-dimensioning, over-provisioning, or other similar term, can be used to refer to adjusting the bandwidth or the use of the bandwidth of the CQI, PUCCH, or other signalling which may include control signalling.

(2) The eNB 12 allocates the PUCCH format 2/2a/2b in such a manner that the spectrum edges are left unused. In one exemplary approach, the number of unused PUCCH format 2/2a/2b resources is defined to be $k \times 2N_{sc}^{RB}$, where $k \in [0,1, 2, \ldots]$ (i.e., a multiple of two RBs). The unused resources are set to be $n_{PUCCH}^{(2)} \in [0,1,2, \ldots, (k \times 2N_{sc}^{RB}-1)]$. One option for the eNB 12 is to begin allocating the periodic CQI resources (PUCCH formats 2/2a/2b) from the last available PUCCH format 2/2a/2b resource ($N_{RB}^{(2)} N_{sc}^{RB} + (N_{sc}^{RB} - N_{cs}^{(1)} - 2)$).

As an additional embodiment, it is possible to arrange UEs 10s inside the PUCCH resource taking into account the power margin with respect to the maximum transmission power. Due to out-band emission consideration it may be beneficial to allocate those UEs not responsible for causing excessive interference (to the adjacent bands) into the outer-most (in frequency) allocated PUCCH resources. Power control parameters can also be optimized to minimize the out-band interference.

(3) With the use of the PUCCH configuration described in items 1 and 2 above the following scheduling restrictions can be applied as well:

PUSCH allocations do not exceed the adjusted UL system bandwidth; and

PRACH allocations do not exceed the adjusted UL system bandwidth.

In certain situations it is possible to allocate PUSCH and PRACH so as to also be outside the adjusted UL system bandwidth. This could be the case, e.g., in the LTE-A system. Utilization of this frequency resource can be based on power margin with respect to the maximum transmission power. Furthermore, UEs being scheduled into this resource may be subject to PC parameter optimization with respect to the PUCCH and out-band interference.

Further, in accordance with the exemplary embodiments of the invention the terms out-band and out-of-band relate in a non-limiting manner to outside a system bandwidth or portion thereof, and these terms may be used interchangeably in this specification.

(4) A sounding reference signal can be semi-statically configured taking into account the PUCCH configuration subject to this invention. As was noted above, in LTE Rel. 8 it has been decided that the sounding reference signal transmission should not puncture the PUCCH bandwidth.

As should be appreciated, the use of these exemplary embodiments of the invention provides several options for achieving a more flexible spectrum usage in LTE and LTE-A systems.

FIG. 6 shows different LTE-A use cases in accordance with the exemplary embodiments, where FIG. 6a may be viewed as an already proposed technique that shows an example of a 3×20 MHz deployment of the LTE-A UL system. FIG. 6a assumes that one of the 20 MHz sub-bands contains all the LTE Rel. 8 UEs, and thus contains the Rel. 8 PUCCH.

FIGS. 6b and 6c show two use cases where the Rel. 8 PUCCH is made narrower by the use of these exemplary embodiments, with the goal being to provide a larger continuous spectrum for LTE-A UEs 10.

FIG. 6d shows an example where the exemplary embodiments are used to obtain additional flexibility in arranging a multi-cluster transmission in the LTE-A UL system. In some cases it is beneficial (mainly from a cubic metric (CM) point of view) to be able to provide equally spaced clusters for clustered LTE-A transmissions.

The use of these exemplary embodiments provides a number of advantages.

The exemplary embodiments provide for an enhanced selection of parameters used when configuring the PUCCH. These parameters can be signalled to the UE 10 mainly via RRC signalling (both SIB and dedicated signalling). The parameter selection can be made at the network side, and can be configured, e.g., via the O&M 18 interface.

The exemplary embodiments of this invention provide several options for more flexible spectrum usage in LTE and LTE-A systems. These options include, but need not be limited to:

deployment of LTE UL system for arbitrary BW allocation (e.g., 8 MHz);
control of UL ACLR;
an increased amount of continuous transmission BW for LTE-A UEs (SC for TX BW>20 MHz);
a more flexible arrangement of multi-cluster transmission (equally spaced clusters) enabling the CM to be optimized; and
increased flexibility for control signaling in the case of flexible spectrum usage (FSU).

It is further noted that terms such as over-dimensioning, over-provisioning, and blanking (e.g., PUCCH blanking) may be used interchangeably to relate in a non-limiting manner to the exemplary embodiments of the invention as described by these or other terms.

Based on the foregoing it should be apparent that the exemplary embodiments of this invention provide a method, apparatus and computer program product(s) to provide an enhanced allocation of bandwidth for an uplink control channel, and more specifically to provide an adjusted allocation of uplink system bandwidth and an adjusted allocation of an uplink control channel.

FIG. 9 is a logic flow diagram that illustrates the operation of a method, and a result of execution of computer program instructions, in accordance with the exemplary embodiments of this invention. At Block 9A there is a step of over-dimensioning periodic CQI resources (PUCCH format 2/2a/2b) in a predetermined way, and at Block 9B there is a step of allocating the PUCCH format 2/2a/2b in such a manner that the spectrum edges are left unused.

In the method and the execution of the computer program instructions as in the preceding paragraph, where over-dimensioning comprises selecting parameters $N_{RB}^{(2)}$ and $N_{cs}^{(1)}$ such that $N_{RB}^{(2)}N_{sc}^{RB}+(N_{sc}^{RB}-N_{cs}^{(1)}-2)>>$(number of simultaneous resources allocated to PUCCH format 2/2a/2b), where $n_{PUCCH}^{(2)}$ is the resource index (size) for PUCCH formats 2/2a/2b;

$N_{sc}^{RB}$ equals resource block size in the frequency domain, expressed as a number of subcarriers ($N_{sc}^{RB}=12$);

$N_{RB}^{(2)}$ is the bandwidth reserved for PUCCH formats 2/2a/2b, expressed in multiples of $N_{sc}^{RB}$; and $N_{cs}^{(1)}$ is the number of cyclic shifts used for PUCCH formats 1/1a/1b in a mixed resource block (containing PUCCH formats 1/1a/1b and 2/2a/2b).

In the method and the execution of the computer program instructions as in the preceding paragraphs, where over-dimensioning of the PUCCH resource is performed so that a predetermined number of PUCCH format 2/2a/2b resource blocks (RBs) are left unused.

In the method and the execution of the computer program instructions as in the preceding paragraphs, where when allocating the number of unused PUCCH format 2/2a/2b resources is defined to be $k \times 2N_{sc}^{RB}$, where $k \in [0,1,2, \ldots]$, where the unused resources are set to be $n_{PUCCH}^{(2)} \in [0,1, 2, \ldots, (k \times 2N_{sc}^{RB}-1)]$.

In the method and the execution of the computer program instructions as in the preceding paragraph, further comprising allocating the periodic CQI resources (PUCCH formats 2/2a/2b) from a last available PUCCH format 2/2a/2b resource ($N_{RB}^{(2)}N_{sc}^{RB}+(N_{sc}^{RB}-N_{cs}^{(1)}-2)$).

In the method and the execution of the computer program instructions as in the preceding paragraphs, where PUSCH allocations do not exceed an adjusted UL system bandwidth and where PRACH allocations do not exceed the adjusted UL system bandwidth.

In the method and the execution of the computer program instructions as in the preceding paragraphs, where sounding reference signals may be semi-statically configured with respect to the repetition factor and bandwidth within the PUCCH area.

The various blocks shown in FIG. 9 may be viewed as method steps, and/or as operations that result from operation of computer program code, and/or as a plurality of coupled logic circuit elements constructed to carry out the associated function(s).

These exemplary embodiments also provide an apparatus comprising means for over-dimensioning periodic CQI resources (PUCCH format 2/2a/2b) in a predetermined way, and means responsive to said over-dimensioned resources for allocating the PUCCH format 2/2a/2b in such a manner that the spectrum edges are left unused. The apparatus may be embodied as one or more integrated circuits.

In addition, FIG. 10 is a logic flow diagram that illustrates a method, apparatus, and computer program product(s), in accordance with the exemplary embodiments of the invention. At Block 10A there is a step of over-provisioning a radio resource comprising a periodic channel quality indicator resource in a predetermined way, and at Block 10B there is a step of allocating the radio resource in such a manner that at least one of an effective system bandwidth is reduced and out-of-band emissions related to the allocated radio resource are taken into account.

In the method, apparatus, and computer program of the preceding paragraph, where the radio resource comprises at least one of a physical uplink control channel resource, a physical uplink shared channel resource, and a physical random access channel resource.

In the method, apparatus, and computer program of the preceding paragraphs, where allocating comprises a pre-determined at least one periodic channel quality indicator resource is one of left unused or blanked.

In the method, apparatus, and computer program of the preceding paragraph, where the radio resource comprises at least one of a physical uplink shared channel resource and a physical random access channel resource, and where the at least one of the physical uplink shared channel resource and the physical random access channel resource is allocated where the pre-determined at least one periodic channel quality indicator resource is one of left unused or blanked.

In the method, apparatus, and computer program of the preceding paragraphs, where the allocating comprises at least one of controlling and selecting a transmission power to be used on the pre-determined portion of the over-provisioned radio resource in order to control the out-of-band emissions in pre-defined way.

In the method, apparatus, and computer program of the preceding paragraphs, where the periodic channel quality indicator resource comprises at least one of a physical uplink control channel format 2, 2a, and 2b, where the over-provisioning comprises selecting parameters $N_{RB}^{(2)}$ and $N_{cs}^{(1)}$ such that $N_{RB}^{(2)} N_{sc}^{RB} + (N_{sc}^{RB} - N_{cs}^{(1)} - 2) >>$ (a number of simultaneous resources allocated to the at least one of the physical uplink control channel format 2, 2a, and 2b), and where the number of simultaneous resources allocated to the at least one of the physical uplink control channel format 2, 2a, and 2b is equal to $n_{PUCCH}^{(2)}$, where $n_{PUCCH}^{(2)}$ is a resource index for resources used for the physical uplink control channel formats 2, 2a, and 2b, where $N_{sc}^{RB}$ equals a resource block size in a frequency domain, expressed as a number of subcarriers, where $N_{RB}^{(2)}$ is a bandwidth reserved for the physical uplink control channel formats 2, 2a, and 2b, expressed in multiples of $N_{sc}^{RB}$, where $N_{cs}^{(1)}$ is a number of cyclic shifts used for at least one of a physical uplink control channel format 1, 1a, and 1b in a mixed resource block, and where $n_{PUCCH}^{(2)}$ is a resource index for resources used for physical uplink control channel formats 2, 2a, and 2b.

In the method, apparatus, and computer program of the preceding paragraphs, where allocating the radio resource comprises allocating at least one physical uplink control channel format 2, 2a, and 2b resource, where the allocating is defined by $k \times 2 N_{sc}^{RB}$, where $k \in [0,1,2,\ldots]$, and where unused resources are set to be $n_{PUCCH}^{(2)} \in [0,1,2,\ldots,(k \times 2 N_{sc}^{RB}-1)]$, where $n_{PUCCH}^{(2)}$ is a resource index for resources used for physical uplink control channel formats 2, 2a, and 2b, and where $N_{sc}^{RB}$ equals a resource block size in a frequency domain, expressed as a number of subcarriers.

In the method, apparatus, and computer program of the preceding paragraphs, where the periodic channel quality indicator resource comprises at least one of physical uplink control channel formats 2, 2a, and 2b, and further comprising allocating the at least one of the physical uplink control channel formats 2, 2a, and 2b from a last available physical uplink control channel formats 2, 2a, and 2b resource as defined by $(N_{RB}^{(2)} N_{sc}^{RB} + (N_{sc}^{RB} - N_{cs}^{(1)} - 2))$, where $N_{sc}^{RB}$ equals a resource block size in a frequency domain, expressed as a number of subcarriers, where $N_{RB}^{(2)}$ is a bandwidth reserved for the physical uplink control channel formats 2, 2a, and 2b, expressed in multiples of $N_{sc}^{RB}$, and where $N_{cs}^{(1)}$ is a number of cyclic shifts used for at least one of a physical uplink control channel format 1, 1a, and 1b in a mixed resource block.

In the method, apparatus, and computer program of the preceding paragraphs, where the radio resource comprises a sounding reference signal resource, and where allocating comprises the sounding reference signal resource is configured to overlap with the over-provisioned periodic channel quality indicator resource.

In the method, apparatus, and computer program of the preceding paragraphs, where system bandwidth is equal to one of 1.4 MHz, 3 NMz, 5 MHz, 10 MHz, 15 MHZ or 20 MHz.

In the method, apparatus, and computer program of the preceding paragraphs where the system is a long term evolution system.

In the method, apparatus, and computer program of the preceding paragraphs, where the radio resource is an uplink radio resource.

In the method, apparatus, and computer program of the preceding paragraphs, transmitting at least one of a physical uplink shared channel, a physical random access channel, and a sounding reference signal using the over-provisioned radio resource corresponding to the periodic channel quality indicator resource.

The method of the preceding paragraphs performed, and the apparatus and computer program of the preceding paragraphs embodied in a user equipment.

A computer readable medium encoded with a computer program executable by a processor embodied in the apparatus and configured to perform the method of the preceding paragraphs.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system and the LTE-Advanced system, it should be appreciated that the exemplary embodiments of this invention are not limited for use with only these particular types of wireless communication systems, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   over dimensioning a radio resource comprising a periodic channel quality indicator resource; and
   allocating the over dimensioned radio resource, where the allocating comprises a reduction of an effective system bandwidth by at least one of leaving at least one pre-determined radio resource unused and by blanking at least one pre-determined radio resource.

2. The method according to claim 1, where the radio resource comprises at least one of a physical uplink control channel resource, a physical uplink shared channel resource, and a physical random access channel resource.

3. The method according to claim 1, where allocating comprises allocating a pre-determined at least one periodic channel quality indicator resource so that the at least one periodic channel quality indicator resource is one of left unused or blanked.

4. The method according to claim 3, where the radio resource comprises at least one of a physical uplink shared channel resource and a physical random access channel resource, and where the at least one of the physical uplink shared channel resource and the physical random access channel resource is allocated where the pre-determined at least one periodic channel quality indicator resource is one of left unused or blanked.

5. The method according to claim 1, where the allocating comprises at least one of controlling and selecting a transmission power to be used on the pre-determined portion of the over-dimensioned radio resource in order to control out-of-band emissions in a pre-defined way.

6. The method according to claim 1 where the periodic channel quality indicator resource comprises at least one of a physical uplink control channel format 2, 2a, and 2b, where the over-dimensioning comprises selecting parameters $N_{RB}^{(2)}$ and $N_{cs}^{(1)}$ such that $N_{RB}^{(2)}N_{sc}^{RB}+(N_{sc}^{RB}-N_{cs}^{(1)}-2) \gg$ (a number of simultaneous resources allocated to the at least one of the physical uplink control channel format 2, 2a, and 2b), and where the number of simultaneous resources allocated to the at least one of the physical uplink control channel format 2, 2a, and 2b is equal to $n_{PUCCH}^{(2)}$, where $n_{PUCCH}^{(2)}$ is a resource index for resources used for the physical uplink control channel formats 2, 2a, and 2b where $N_{sc}^{RB}$ equals a resource block size in a frequency domain, expressed as a number of subcarriers, where $N_{RB}^{(2)}$ is a bandwidth reserved for the physical uplink control channel formats 2, 2a, and 2b, expressed in multiples of $N_{sc}^{RB}$, where $N_{cs}^{(1)}$ is a number of cyclic shifts used for at least one of a physical uplink control channel format 1, 1a, and 1b in a mixed resource block, and where $n_{PUCCH}^{(2)}$ is a resource index for resources used for physical uplink control channel formats 2, 2a, and 2b.

7. The method according to claim 1, where allocating the radio resource comprises allocating at least one physical uplink control channel format 2, 2a, and 2b resource, where the allocating is defined by $k \times 2N_{sc}^{RB}$, where $k \in [0,1,2...]$, and where unused resources are set to be $n_{PUCCH}^{(2)} \in [0,1,2,...,(k \times 2N_{sc}^{RB}-1)]$, where $n_{PUCCH}^{(2)}$ is a resource index for resources used for physical uplink control channel formats 2, 2a, and 2b, and where $N_{sc}^{RB}$ equals a resource block size in a frequency domain, expressed as a number of subcarriers.

8. The method according to claim 1, where the periodic channel quality indicator resource comprises at least one of physical uplink control channel formats 2, 2a, and 2b; and further comprising allocating the at least one of the physical uplink control channel formats 2, 2a, and 2b from a last available physical uplink control channel formats 2, 2a, and 2b resource as defined by $(N_{RB}^{(2)}N_{sc}^{RB}+(N_{sc}^{RB}-N_{cs}^{(1)}-2))$, where $N_{sc}^{RB}$ equals a resource block size in a frequency domain, expressed as a number of subcarriers, where $N_{RB}^{(2)}$ is a bandwidth reserved for the physical uplink control channel formats 2, 2a, and 2b, expressed in multiples of $N_{sc}^{RB}$, and where $N_{cs}^{(1)}$ is a number of cyclic shifts used for at least one of a physical uplink control channel format 1, 1a, and 1b in a mixed resource block.

9. The method according to claim 1, where the radio resource comprises a sounding reference signal resource, and where allocating comprises the sounding reference signal resource is configured to overlap with the over-dimensioned periodic channel quality indicator resource.

10. The method according to claim 1, where system bandwidth is equal to one of 1.4 MHz, 3 MHz, 5 MHz, 10 MHz, 15 MHZ or 20 MHz.

11. The method according to claim 10, where the system bandwidth is part of a long term evolution system.

12. The method according to claim 1, where the radio resource is an uplink radio resource.

13. A non-transitory computer readable medium encoded with a computer program executable by a processor to perform the method of claim 1.

14. An apparatus, comprising:
   at least one processor; and
   at least one memory including computer program code, where the at least one memory and the computer program code are configured, with the at least one processor, to cause the apparatus to at least:
   over-dimension a radio resource comprising a periodic channel quality indicator resource; and
   allocate the over-dimensioned radio resource, where the allocating comprises a reduction of an effective system bandwidth by at least one of leaving at least one pre-determined radio resource unused and by blanking at least one pre-determined radio resource.

15. The apparatus according to claim 14, where the radio resource comprises at least one of a physical uplink control channel resource, a physical uplink shared channel resource, and a physical random access channel resource.

16. The apparatus according to claim 14, where allocating comprises the at least one memory including the computer program code is configured with the at least one processor to cause the apparatus to allocate a pre-determined at least one periodic channel quality indicator resource so that the at least one periodic channel quality indicator resource is one of left unused or blanked.

17. The apparatus according to claim 16, where the radio resource comprises at least one of a physical uplink shared channel resource and a physical random access channel resource, and where the at least one memory including the computer program code is configured with the at least one processor to cause the apparatus to allocate the at least one of the physical uplink shared channel resource and the physical random access channel resource to where the pre-determined at least one periodic channel quality indicator resource is one of left unused or blanked.

18. The apparatus according to claim 14, where the allocating comprises the at least one memory including the computer program code is configured with the at least one processor to cause the apparatus to at least one of control and select a transmission power to be used on the pre-determined portion of the over-dimensioned radio resource in order to control out-of-band emissions in a pre-defined way.

19. The apparatus according to claim 14, where the periodic channel quality indicator resource comprises at least one of a physical uplink control channel format 2, 2a, and 2b, where the over-dimensioning comprises the is at least one memory including the computer program code is configured with the at least one processor to cause the apparatus to select parameters $N_{RB}^{(2)}$ and $N_{cs}^{(1)}$ such that $N_{RB}^{(2)}N_{sc}^{RB}+(N_{sc}^{RB}-N_{cs}^{(1)}-2) >> $ (a number of simultaneous resources allocated to the at least one of the physical uplink control channel format 2, 2a, and 2b), and where the processor is further configured to allocate the number of simultaneous resources to the at least one of the physical uplink control channel format 2, 2a, and 2b is equal to $n_{PUCCH}^{(2)}$, where $n_{PUCCH}^{(2)}$ is a resource index for resources used for the physical uplink control channel formats 2, 2a, and 2b where $N_{sc}^{RB}$ equals a resource block size in a frequency domain, expressed as a number of subcarriers, where $_{RB}^{(2)}$ is a bandwidth reserved for the physical uplink control channel formats 2, 2a, and 2b, expressed in multiples of $N_{sc}^{RB}$, where $_{cs}^{(1)}$ is a number of cyclic shifts used for at least one of a physical uplink control channel format 1, 1a, and 1b in a mixed resource block, and where $n_{PUCCH}^{(2)}$ is a resource index for resources used for physical uplink control channel formats 2, 2a, and 2b.

20. The apparatus according to claim 14, where allocating the radio resource comprises the at least one memory including the computer program code is configured with the at least one processor to cause the apparatus to allocate at least one physical uplink control channel format 2, 2a, and 2b resource, where the allocating is defined by $k \times 2N_{sc}^{RB}$, where $k \in [0,1,2,\ldots]$, and where unused resources are set to be $n_{PUCCH}^{(2)} \in [0,1,2,\ldots,(k\times 2N_{sc}^{RB}-1)]$, where $n_{PUCCH}^{(2)}$ is a resource index for resources used for physical uplink control channel formats 2, 2a, and 2b, and where $N_{sc}^{RB}$ equals a resource block size in a frequency domain, expressed as a number of subcarriers.

21. The apparatus according to claim 14, where the periodic channel quality indicator resource comprises at least one of physical uplink control channel formats 2, 2a, and 2b; and further comprising allocating the at least one of the physical uplink control channel formats 2, 2a, and 2b from a last available physical uplink control channel formats 2, 2a, and 2b resource as defined by $(N_{RB}^{(2)}N_{sc}^{RB}+(N_{sc}^{RB}-N_{cs}^{(1)}-2))$, where $N_{sc}^{RB}$ equals a resource block size in a frequency domain, expressed as a number of subcarriers, where $N_{RB}^{(2)}$ is a bandwidth reserved for the physical uplink control channel formats 2, 2a, and 2b, expressed in multiples of $N_{sc}^{RB}$, and where $N_{cs}^{(1)}$ is a number of cyclic shifts used for at least one of a physical uplink control channel format 1, 1a, and 1b in a mixed resource block.

22. The apparatus according to claim 14, where the radio resource comprises a sounding reference signal resource, and where allocating comprises the at least one memory including the computer program code is configured with the at least one processor to cause the apparatus to allocate the sounding reference signal resource to overlap with the over-dimensioned periodic channel quality indicator resource.

23. The apparatus according to claim 14, where system bandwidth is equal to one of 1.4 MHz, 3 MHz, 5 MHz, 10 MHz, 15 MHZ or 20 MHz.

24. The apparatus according to claim 14, comprising a transmitter configured to transmit at least one of a physical uplink shared channel, a physical random access channel, and a sounding reference signal using the over-dimensioned radio resource corresponding to the periodic channel quality indicator resource.

25. The apparatus of claim 24 embodied in a user equipment.

26. An apparatus, comprising:
means for over-dimensioning a radio resource comprising a periodic channel quality indicator resource in a predetermined way; and
means for allocating the over-dimensioned radio resource where the allocating comprises a reduction of an effective system bandwidth by at least one of leaving at least one pre-determined radio resource unused and by blanking at least one pre-determined radio resource.

27. The apparatus according to claim 26, where the radio resource comprises at least one of a physical uplink control channel resource, a physical uplink shared channel resource, and a physical random access channel resource.

* * * * *

UNITED STATES PATENT AND TRADEMARK OFFICE
CERTIFICATE OF CORRECTION

PATENT NO. : 8,897,249 B2  
APPLICATION NO. : 13/767132  
DATED : November 25, 2014  
INVENTOR(S) : Tiirola et al.

Page 1 of 1

It is certified that error appears in the above-identified patent and that said Letters Patent is hereby corrected as shown below:

In the claim

Claim 19, col. 17, line 46 " $R_B^{(2)}$ " should be deleted and -- $N_{RB}^{(2)}$ -- should be inserted.

Claim 19, col. 17, line 49 " $_{cs}^{(1)}$ " should be deleted and -- $N_{cs}^{(1)}$ -- should be inserted.

Signed and Sealed this  
Third Day of March, 2015

Michelle K. Lee  
*Deputy Director of the United States Patent and Trademark Office*